United States Patent Office 3,832,307
Patented Aug. 27, 1974

3,832,307
HYDROGENATION CATALYST
Walter H. Seitzer, West Chester, Pa., assignor to Sun Research and Development Co., St. Davids, Pa.
No Drawing. Original application Apr. 29, 1971, Ser. No. 138,750, now Patent No. 3,723,298, dated Mar. 27, 1973. Divided and this application Nov. 13, 1972, Ser. No. 306,063
Int. Cl. B01j 11/40
U.S. Cl. 252—455 Z          2 Claims

ABSTRACT OF THE DISCLOSURE

Hydrogenation of a mineral oil containing aromatic hydrocarbons by use of a hydrogenation catalyst comprised of a Y-zeolite containing arsenic.

CROSS REFERENCE TO RELATED APPLICATION

This is a division of application Ser. No. 138,750, filed Apr. 29, 1971 now U.S. 3,723,298 which issued Mar. 27, 1973.

It is known, in the art to effect hydrogenation of mineral oils containing aromatic hydrocarbons so as to obtain products of lower boiling range; e.g. materials in the gasoline range. For example, U.S. 3,197,398 (D. A. Young, issued July 27, 1965) discloses such a process where the catalyst used is a molecular sieve of the "X," "Y," or "L" crystal type containing a Group VIII metal. It is also known to the skilled art worker in the field of catalytic hydrogenation that arsenic acts as a poison or inhibitor of a large number of catalysts in numerous types of reactions. In the text "Catalysis" by Berkman, Morrell, and Egloff (Reinhold, 1940) it is repoted at page 393 that arsenious oxide "due to its reduction to arsine, is a strong poison for catalytic hydrogenation with platinum as catalyst."

It has now unexpectedly been found, however, that hydrocarbons such as mineral oil containing aromatic components are effectively hydrogenated to a hydrocarbon composition of less aromaticity and greater saturation by use of a hydrogenation catalyst consisting of a "Y" type zeolite molecular sieve which contains arsenic or a combination of arsenic with iron, cobalt, or zinc.

The catalysts of this invention may be employed for the hydrogenation of substantially any mineral oil fraction boiling above the conventional gasoline range, i.e., above about 300° F., and usually above about 400° F., and having an end-boiling-point up to about 1000° F., but preferably not greater than about 850° F. These feedstocks may be sulfur-free, or they may contain up to about 5% by weight of sulfur, in the form of organic sulfur compounds. They may also contain organic nitrogen compounds. Specific feedstocks contemplated comprise straight-run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like. Specifically, it is preferred to employ oils having an end-boiling-point between about 400° and 650° F., an API gravity between about 30 and 35°, and containing at least about 20% by volume of aromatic hydrocarbons.

Hydrogenation conditions to be employed in the process of the invention will be within the following ranges:

|  | Operative | Preferred |
|---|---|---|
| Temperature, ° C. | 200–460 | 260–400 |
| Pressure, p.s.i.g. | 400–5,000 | 750–2,000 |
| H./oil ratio, s.c.f./B | 1,000–15,000 | 2,000–10,000 |

The arsenic containing catalyst, as indicated, is prepared from commercially available Y-type molecular sieves. The Y molecular sieves having crystal pore diameters of about 9 to 10 A., and wherein the $SiO_2/Al_2O_3$ ratio is about 4–6, are preferred. The catalyst is prepared from the ammonium form of the sieve which may be obtained by treating the hydrogen form with ammonium chloride and then washing with water until chloride ions are no longer present. The ammonium form of the molecular sieve is then treated with an aqueous solution of arsenic pentoxide at elevated temperature (about 85–95° C.) for several hours and then filtered and dried at about 150° C. During this treatment arsenic is absorbed on the zeolite surface. The catalyst is further heated at about 400° C. for about one to three hours to effect activation.

The amount of arsenic on the molecular sieve may vary from about 1% to about 15% by weight, preferably about 5% to 10%. The amount of arsenic on the support is readily controlled by the amount of arsenic pentoxide in the aqueous treating medium and by the time of treatment, which techniques are known in the art.

As indicated above, the arsenic containing molecular sieve catalyst may also have present iron, cobalt, or zinc. The arsenic and iron combination results in a more active hydrogenation catalyst. The combination of arsenic with cobalt or zinc, although not more active for hydrogenation than arsenic alone, is desirable for use with high nitrogen containing feeds as these combinations significantly lower the nitrogen content in the hydrogenated products. It is of interest to note that combination of arsenic with certain other metals are detrimental to hydrogenation. For example, arsenic in combination with molybdenum, a known promoter for hydrogenation catalysts, shows significantly less hydrogenation activity than the molybdenum alone. Thus, the known high specificity of catalytic action is clearly in evidence. When using combinations of arsenic with cobalt, zinc, or iron the amounts of these metals present on the catalyst will be from about 1% to about 15%, preferably, 3% to 7%. Like the arsenic, they are put on the catalyst from an aqueous solution of their water soluble salts.

In order to further illustrate the invention the following examples are given:

EXAMPLE 1

A commercial Y zeolite (Linde-SK-40) was treated three times with an aqueous solution of ammonium chloride at 80° C. for one-half hour and then washed with water until free of chloride. Then, 150 grams of the ammonium zeolite was then stirred in a solution of 25 g. of arsenic pentoxide in 450 ml. of water at 90° C. for 16 hours. The solids were filtered off and heated in a rotating furnace at about 400° C. for two hours.

One part by weight of catalyst and five parts of a slurry oil (a petroleum fraction boiling at 550° to 950° F. and containing 1.3% sulfur) were placed in a stirred batch reactor, heated to 400° C. and pressured to 2500 p.s.i.g. with hydrogen. A drop in hydrogen pressure to 1300 p.s.i.g. indicated that hydrogenation had occurred. The product oil contained 14% by volume of lighter boiling distillate (below 430° F.).

EXAMPLE 2

A catalyst was prepared as in Example 1 except that iron was incorporated with the arsenic by exchanging 50 grams of the arsenic-ammonium Y zeolite with a solution of 40 grams of ferrous chloride in 300 ml. water at 90° C. for 4 hours, filtering, drying, and heat treated as in Example 1. The slurry oil was similarly hydrogenated at 400° C. and the amount of hydrogen absorbed was equivalent to 3600 p.s.i.g. Over 20% by volume of the product distilled below 430° F.

When the hydrogenation was repeated using a similar catalyst, but free of arsenic, hydrogen absorption was only an amount equivalent to 1700 p.s.i.g.

EXAMPLE 3

Example 2 was repeated at 430° C., but using anthracene oil (a coal tar distillate containing 1% nitrogen and 0.65% sulfur) instead of slurry oil. The hydrogen absorption using the catalyst with arsenic with 34% higher than with the catalyst containing iron only.

EXAMPLE 4

A catalyst was prepared from a Y-type molecular sieve as in Example 1 by treating 50 grams of the arsenic pentoxide-impregnated ammonium Y zeolite with a solution of 15 grams of zinc nitrate in 200 ml. water at 90° C. for 4 hours, and then filtering, drying and heat-treating at 40° C. for two hours.

Using this catalyst for hydrogenation of anthracene oil at 430° C. temperature, an amount of hydrogen uptake equivalent to 3300 p.s.i.g. was observed. When using a similar catalyst containing zinc, but without the arsenic, the hydrogen uptake measured was only 110 p.s.i.g. Another significant advantage for the arsenic containing catalyst in this instance is that it resulted in a product having less than 0.02% nitrogen whereas the run with the arsenic free catalyst gave a product having 0.3% nitrogen.

EXAMPLE 5

Using a catalyst of a Y-type molecular sieve prepared as in Example 2 but containing cobalt instead of iron, hydrogenation of anthracene oil was carried out to give 14% by volume of a liquid product distilling below 430° F. The liquid product distilling above 430° C. contained 0.20% sulfur and 0.10% nitrogen. When the hydrogenation was repeated using a similar cobalt Y zeolite catalyst free of arsenic, slightly more hydrogen was absorbed, but the liquid product distilling above 430° F. contained 0.27% sulfur and 0.22% nitrogen.

It is clear from the above examples of the invention that the Y-type zeolite containing arsenic is an effective catalyst for hydrogenation. It is also significant that combinations of arsenic with iron result in increased hydrogenation activity, and combination of arsenic with zinc or cobalt result in significant nitrogen removal from the petroleum oil hydrogenated.

The invention claimed is:

1. A catalyst composition consisting essentially of a Y-zeolite having associated therewith from 1% to 15% by weight of arsenic or a combination of said arsenic with 1% to 15% by weight of zinc.

2. A composition as in Claim 1 wherein the arsenic content of the catalyst is 5% to 10% and the amount of zinc is 3% to 7%.

References Cited

UNITED STATES PATENTS

| | | | |
|---|---|---|---|
| 3,527,825 | 9/1970 | Pollitzer | 252—455 Z |
| 3,629,149 | 12/1971 | Mulaskey | 252—455 Z |
| 3,697,448 | 10/1972 | Johnson et al. | 252—455 Z |
| 3,654,185 | 4/1972 | Berry | 252—455 Z |

CARL F. DEES, Primary Examiner